United States Patent
Park et al.

(10) Patent No.: US 11,338,429 B2
(45) Date of Patent: May 24, 2022

(54) ROBOT

(71) Applicant: LG ELECTRONICS INC., Seoul (KR)

(72) Inventors: Hyunchul Park, Seoul (KR); Changil Shin, Seoul (KR); Eunsook Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 316 days.

(21) Appl. No.: 16/519,870

(22) Filed: Jul. 23, 2019

(65) Prior Publication Data

US 2019/0344428 A1    Nov. 14, 2019

Related U.S. Application Data

(63) Continuation of application No. PCT/KR2019/002709, filed on Mar. 8, 2019.

(51) Int. Cl.
*B25J 9/00* (2006.01)
*B25J 11/00* (2006.01)
(Continued)

(52) U.S. Cl.
CPC .......... *B25J 9/0003* (2013.01); *B25J 11/0005* (2013.01); *B25J 13/003* (2013.01); *B25J 19/023* (2013.01)

(58) Field of Classification Search
CPC .... B25J 9/0003; B25J 11/0005; B25J 19/023; B25J 13/003; B25J 11/008; B25J 9/1697; B25J 9/1679; B25J 9/126
See application file for complete search history.

(56) References Cited

U.S. PATENT DOCUMENTS

2001/0020837 A1   9/2001   Yamashita et al.
2006/0173577 A1   8/2006   Takeda et al.
(Continued)

FOREIGN PATENT DOCUMENTS

| JP | 2001-188555 | 7/2001 |
|---|---|---|
| JP | 4276624 | 6/2009 |
| KR | 10-2011-0030925 | 3/2011 |

OTHER PUBLICATIONS

로봇 시스템 및 이의 제어 방법. 서울시산 학연포럼,, [online], 2008년 6월 8일,, Nov. 25, 2019:http://www.sforum.co.kr/business/business_030100.html?bmain=view&uid=48 (English translation attached).

(Continued)

*Primary Examiner* — Basil T. Jos
(74) *Attorney, Agent, or Firm* — KED & Associates LLP (57) ABSTRACT

Disclosed is a robot including a microphone configured to acquire a voice, a camera configured to acquire a first image including a gesture, and a controller configured to recognize the acquired voice, recognize a pointed position corresponding to the gesture included in the first image, control the camera to acquire a second image including the recognized pointed position, identify a pointed target included in the second image, and perform a control operation on the basis of the identified pointed target and a command included in the recognized voice.

16 Claims, 7 Drawing Sheets

(51) Int. Cl.
*B25J 19/02* (2006.01)
*B25J 13/00* (2006.01)

(56) References Cited

U.S. PATENT DOCUMENTS

| | | |
|---|---|---|
| 2011/0071674 A1 | 3/2011 | Jeon et al. |
| 2017/0361466 A1 | 12/2017 | Anderson |
| 2019/0317594 A1* | 10/2019 | Stent .................... G06K 9/4671 |
| 2020/0101614 A1* | 4/2020 | Thackston ............. B25J 19/023 |
| 2020/0341480 A1* | 10/2020 | Jung .................... G05D 1/0223 |

OTHER PUBLICATIONS

International Search Report dated Dec. 6, 2019 issued in Application No. PCT/KR2019/002709.

* cited by examiner

COMMAND: REMOVE
TARGET: FOREIGN OBJECT
COORDINATES:(201,53)
DEVICE: ROBOT CLEANER

ROBOT

CROSS-REFERENCE TO RELATED APPLICATIONS

This application is a continuation of International Application No. PCT/KR2019/002709 (filed on, Mar. 8, 2019), which is hereby incorporated by reference in its entirety.

BACKGROUND

Field of the Invention

The present invention relates to a robot, and more particularly, to a robot which recognizes a gesture and a voice of a user and performs an operation based on the recognition result.

Discussion of the Related Art

Robots have been developed for industrial use to handle part of factory automation. Recently, fields of application of robots have been expanded and robots which may be used in daily life as well as medical robots and aerospace robots have also been developed.

Such a robot for a daily life provides a specific service (e.g., shopping, serving, conversation, cleaning, etc.) in response to a user's command (or instruction). Further, the robot for a daily life includes a display to display information or images related to the service.

Meanwhile, such a robot for a daily life may acquire various requests or commands from a user in a voice form using a microphone, and may perform an operation corresponding to the acquired request or command. With a so-called voice input function, the user may conveniently input a request or a command by voice without having to directly operate an operation unit or the like.

In the related art robot, in order for the robot to perform an accurate operation, generally, the user utters a predefined word or phrase to the robot or utters a proper noun or the like clearly indicating an object. In this case, the user performs utterance in a manner different from a usual way of communicating with other people, and thus, the user may feel unnatural or inconvenient at the time of utterance. As a result, there is a limitation in that utilization of the voice input function is low despite the convenience described above.

SUMMARY

An aspect of the present invention is directed to providing a robot which recognizes an object and a command through a gesture and a voice of a user.

Another aspect of the present invention is directed to providing a robot capable of recognizing an object even if a keyword directly indicative of the object is not included in a user's voice.

Another aspect of the present invention is directed to providing a robot which controls another device related to a recognized object and a command to perform an operation.

To achieve these and other advantages and in accordance with the purpose of the disclosure, as embodied and broadly described herein, there is provided a robot including: a microphone configured to acquire a voice; a camera configured to acquire a first image including a gesture; and a controller configured to recognize the acquired voice, recognize a pointed position corresponding to the gesture included in the first image, control the camera to acquire a second image including the recognized pointed position, identify a pointed target included in the second image, and perform a control operation on the basis of the identified pointed target and a command included in the recognized voice.

According to an embodiment, the controller may be configured to recognize the command and a keyword indicative of the pointed target included in the acquired voice.

According to an embodiment, the keyword indicative of the pointed target may include a pronoun related to the pointed target.

According to an embodiment, the controller may be configured to recognize at least one object included in the acquired second image and identify the pointed target on the basis of the at least one recognized object and the keyword.

According to an embodiment, the controller may be configured to recognize at least one object included in the acquired second image and identify an object closest to the pointed position, among the at least one object, as the pointed target.

The gesture may include at least one of a user's hand motion, foot motion, gaze, or face rotation indicative of the pointed position.

According to an embodiment, the camera may include: a first camera disposed in a main body; and a second camera disposed in a head rotatably provided at an upper portion of the main body, the first image is acquired through the first camera, and the second image is acquired through the second camera.

The robot may further include: a head motor configured to rotate the head with respect to the main body, and the controller is configured to control the head motor to cause the second camera to be oriented to the recognized pointed position.

When the performing of a control operation on the basis of the identified pointed target and the recognized command is completed, the controller may be configured to output a notification indicative of completion of processing of the command through at least one of a display or a speaker.

The robot may further include: a communication unit to be connected to at least one device, and the controller may be configured to specify a device available for processing the command on the basis of the identified pointed target and the recognized command, and control the communication unit to transmit a control signal corresponding to the command to the specified device.

According to an embodiment, the controller may be configured to receive a message indicative of completion of processing of the command, and outputs a notification indicative of completion of processing of the command through at least one of a display or a speaker in response to the received message.

According to an embodiment, the controller may be configured to detect whether the command has been completely processed on the basis of an image acquired through the camera, and outputs a notification indicative of completion of processing of the command through at least one of a display or a speaker on the basis of a detection result.

According to an embodiment, the pointed target may include a pointed point, and the controller may be configured to acquire coordinates corresponding to the pointed point.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Reference will now be made in detail to the exemplary embodiments of the present invention, examples of which are illustrated in the accompanying drawings. Wherever possible, the same reference numbers will be used throughout the drawings to refer to the same or like parts.

Hereinafter, specific embodiments of the present invention will be described in detail with reference to the drawings.

Figure 1:
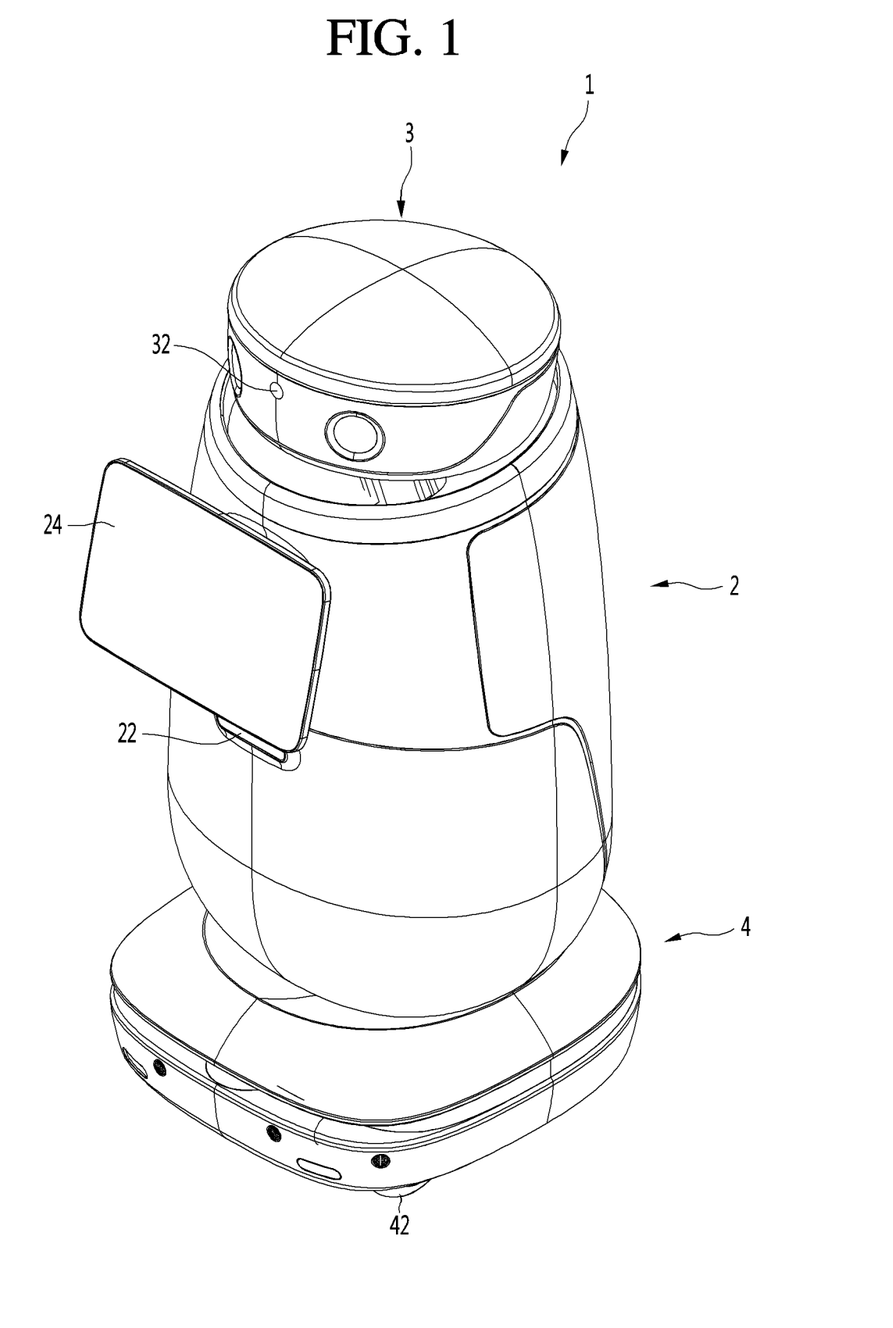
FIG. 1 is a perspective view of a robot according to an embodiment of the present invention.

FIG. 1 is a perspective view of a robot according to an embodiment of the present invention.

The robot 1 according to an embodiment of the present invention may include a body 2, a head 3, and a base 4.

The body 2 may form an overall appearance of the robot 1. The body 2 may have a cylindrical body having an internal space formed therein. The body 2 may extend vertically.

A stereo camera 22 and a display 24 may be provided on a front side of the body 2. Hereinafter, a direction in which the stereo camera 22 and the display 24 are oriented is defined as a front side the robot 1.

The stereo camera 22 may acquire a stereoscopic image including the front side of the robot 1. The robot 1 may perform operations such as user detection, object detection, calculation of a distance to a user or an object, and detection of a position of the robot 1 based on the distance to the object, on the basis of the acquired stereoscopic image.

The display 24 may output information related to an operation or a state of the robot 1, a screen related to a function or a program executed in the robot 1, and the like. Meanwhile, the display 24 may be implemented as a touch screen together with the touch panel to receive a touch input from a user.

Various components related to the operation of the robot 1 may be provided inside or on a surface of the body 2.

An opening portion on which the head 3 is mounted may be formed on an upper side of the body 2. The head 3 may be fastened to the body 2 through the opening. The head 3 may be accommodated in the inside of the body 2 through the opening when the robot 1 is not driven and may protrude upward from the body 2 via the opening when the robot 1 is driven. In addition, the head 3 may protrude from the body 2 at various angles (or heights). To this end, a first head motor 151 (see FIG. 2) for causing the head 3 to protrude at a predetermined angle (or height) from the body 2 may be provided in the body 2 or the head 3.

The head 3 is provided with a head camera 32, and may acquire an image independently of the stereo camera 22. In particular, since the head 3 may be rotated to the left and right with respect to the body 2, the head camera 32 may acquire an image of a region different from that of the stereo camera 22. A second head motor 153 for rotating the head 2 left and right with respect to the body 2 may be provided in the body 2 or the head 3.

The base 4 may form a lower outer appearance of the robot. The base 4 may have a plate-like shape having a predetermined thickness. The body 2 may be fastened to an upper side of the base 4. A plurality of driving wheels 42 for allowing the robot 1 to travel may be provided under the base 4. The base 4 may include a plurality of driving motors 160 (see FIG. 2) connected to the plurality of driving wheels 42.

Meanwhile, the body 2 may be connected to a shaft extending from the base 4 and may be inclined at a predetermined angle forward and backward with respect to the base 4. For example, when the body 2 is inclined forward at a predetermined angle, the stereo camera 22 may acquire an image of a lower region at the predetermined angle. Further, when the body 2 is inclined backward at a predetermined angle, the stereo camera 22 may acquire an image of an upper region at the predetermined angle. The body 2 may have a body tilting motor 155 for tilting the body 2 at a predetermined angle.

Figure 2:
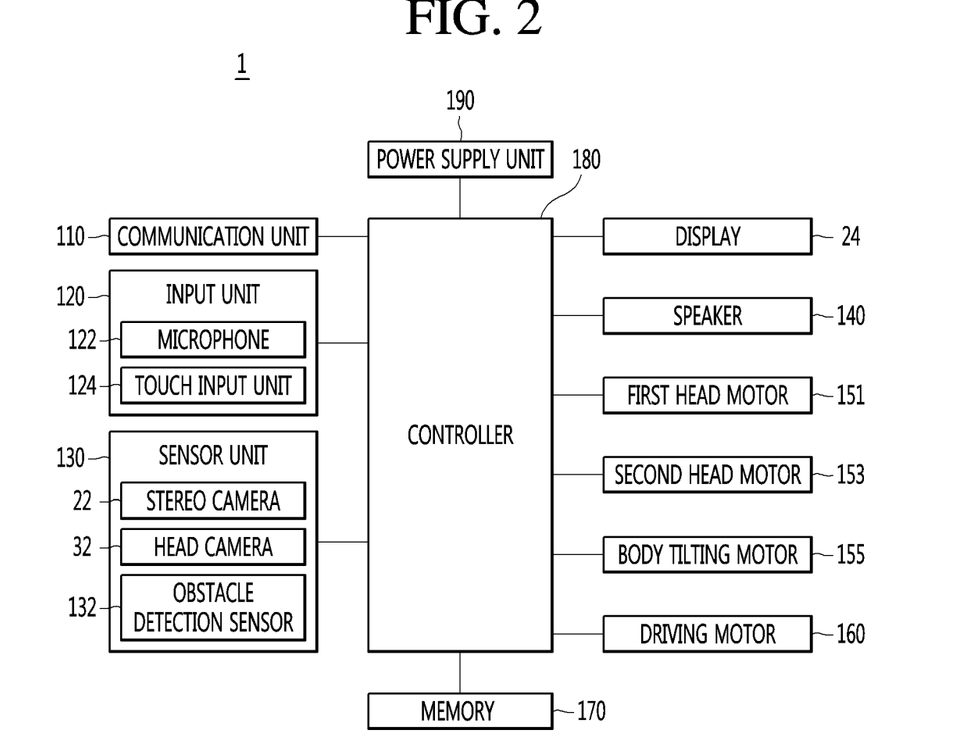
FIG. 2 is a block diagram showing a control configuration of a robot according to an embodiment of the present invention.

FIG. 2 is a block diagram showing a control configuration of a robot according to an embodiment of the present invention.

In FIG. 2, the robot 1 is illustrated to include a communication unit 110, an input unit 120, a sensor unit 130, a display 24, a speaker 140, a first head motor 151, a second head motor 153, a body tilting motor 155, a driving motor 160, a memory 170, a controller 180, and a power supply unit 190. However, the components shown in FIG. 2 are merely illustrative and are not essential for realizing the robot 1, and thus, the robot may not include some of the components shown in FIG. 2. Further, according to an embodiment, the robot may include the components shown in FIG. 2 and further include additional control components.

The communication unit 110 may include at least one communication module for connecting the robot 1 to a server, a terminal, another robot, and the like, via a network. For example, the communication unit 110 may include a short-range communication module such as Bluetooth, near-field communication (NFC), a wireless Internet module such as Wi-Fi, or a mobile communication module. The controller 180 may transmit state information and operation information of the robot, an input received from the user through the input unit 120, and various data acquired by the sensor unit 130 to the server, the terminal, or another robot through the communication unit 110. In addition, the controller 180 may receive control information of the robot, update data of software in the robot, and the like, from the server or the terminal through the communication unit 110.

The input unit 120 may include at least one input means for inputting a predetermined signal or data to the robot by a user's operation or other action. For example, the at least one input means may include a microphone 122, a touch input unit 124, a button, a dial, and the like. The user may input a specific request or command to the robot by operating the input unit 120.

The microphone 122 may receive a voice-type request or command from the user. Meanwhile, the microphone 122 may function as a sensor unit for sensing a voice or a sound around the robot.

The touch input unit 124 may include a touch panel, a touch pad disposed outside the robot, and the like. When the touch input unit 124 includes the touch panel, the display 24 described above with reference to FIG. 1 may correspond to a touch screen integrated with the touch panel.

The sensor unit 130 may include at least one sensor for acquiring various information about the surroundings of the robot. For example, the sensor unit 130 may include various sensors related to the operation of the robot 1, such as the stereo camera 22, the head camera 32, and an obstacle detection sensor 132.

The stereo camera 22 and the head camera 32 may acquire an image around the robot. The controller 180 may detect a user or an object based on the image acquired through the stereo camera 22 or the head camera 32, calculate a distance to the user or the object, or recognize the current position of the robot 1.

The obstacle detection sensor 132 may sense an object as an obstacle to the traveling of the robot 1, while the robot 1 is traveling. For example, the obstacle detection sensor 132 may include an ultrasonic sensor, a LiDar sensor, a proximity sensor, a camera, and the like.

The display 24 and the speaker 140 may output a graphic, text, sound, or the like, indicative of information related to an operation or a state of the robot 1. As described above, the display 24 may be disposed on the main body 2 to face the front side of the robot 1. The speaker 140 may be disposed inside the main body 2 or the head 3 and may output various kinds of information by voice or sound.

The first head motor 151 enables the head 3 to move up and down. By driving the first head motor 151, the head 3 may be accommodated in the main body 2 or protruded from the main body 2 by a predetermined angle (or a predetermined height). The first head motor 151 may be disposed in the main body 2 or the head 3.

The second head motor 153 enables the head 3 to be rotated in a transverse direction. By driving the second head motor 153, the head 3 may be rotated to the left or right by a predetermined angle. As the head 3 is rotated, directions in which the head camera 32 and the stereo camera 22 face may be changed.

The body tilting motor 155 may tilt the body 2 forward and backward at a predetermined angle with respect to the base 4. The body tilting motor 155 may be provided inside the body 2 or the base 4.

The driving motor 160 may provide a rotational force of the driving wheel 42. For example, the driving motor 160 and the driving wheel 42 may each be provided as a pair. The pair of driving motors 160 may be spaced apart from each other horizontally. The pair of driving wheels 42 may also be spaced apart from each other horizontally.

For example, when the controller 180 controls the pair of driving motors 160 in the same manner, the robot may move forward or backward. Meanwhile, when the controller 180 controls the pair of driving motors 160 differently, the robot may rotate. As the robot rotates, the directions in which the display 24, the stereo camera 22, and the head camera 32 face may be changed.

The memory 170 may store control data for controlling the operations of the components included in the robot, an input acquired through the input unit 120, the sensor unit 130, etc., and various data such as data for performing an operation corresponding to information.

Also, the memory 170 may store device information for each of at least one device connected to the robot 1. As described hereinafter with reference to FIG. 7, etc., the controller 180 may recognize a pointed target based on a voice and a gesture of the user and a command, and specify a device available for processing the command based on a recognition result. Here, the controller 180 may specify the device available for processing the command based on the device information stored in the memory 170 and may transmit a control signal to the specified device.

The controller 180 may include at least one controller (processor) that controls an overall operation of the robot. The at least one controller may include a CPU, an application processor (AP), a microcomputer, an integrated circuit, an application specific integrated circuit (ASIC), a field programmable gate array (FPGA), etc.

In particular, the controller 180 may acquire a voice of the user through the microphone 122 and acquire a gesture of the user through the stereo camera 22. The controller 180 may recognize a pointed position based on the acquired gesture and acquire an image including the recognized pointed position through the head camera 32 or the stereo camera 22. The controller 180 may identify the pointed target or the pointed point based on the acquired image. To this end, the controller 180 may include an image recognition processor (not shown) for recognizing the acquired image.

Also, the controller 180 may recognize a command (control command, etc.) based on the acquired voice. To this end, the controller 180 may include a voice recognition processor (not shown) for recognizing the acquired voice.

The controller 180 may perform a control operation based on the identified pointed target (or point) and the recognized command or may transmit a control signal to a related device.

The power supply unit 190 may supply power for the operation of each of the components included in the robot. For example, the power supply unit 190 may include a battery included in the main body 2.

Figure 3:
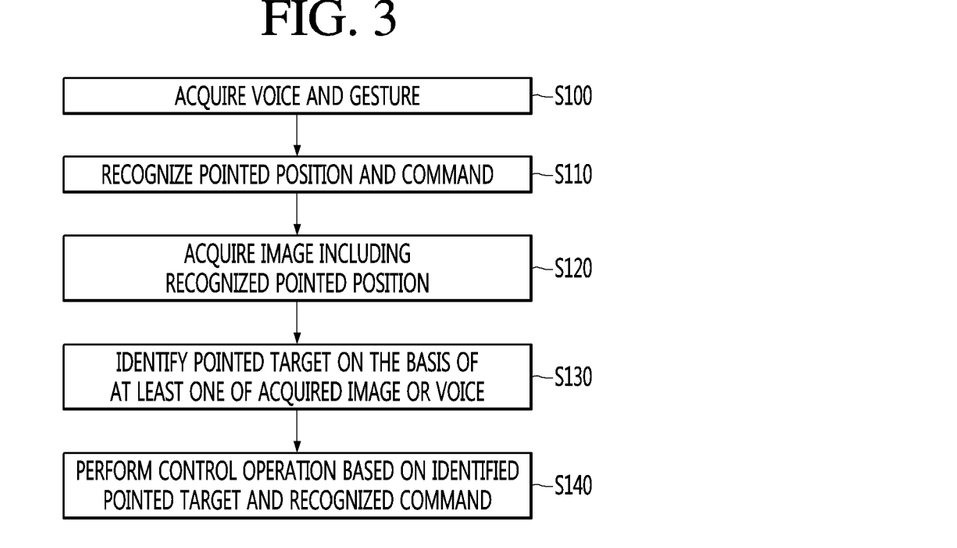
FIG. 3 is a flowchart illustrating an operation method of the robot according to an embodiment of the present invention.

FIG. 3 is a flowchart illustrating an operation method of a robot according to an embodiment of the present invention.

Referring to FIG. 3, the robot 1 may acquire a voice and a gesture from a user (S100).

The controller 180 of the robot 1 may acquire the user's voice through the microphone 122. Further, the controller 180 may acquire an image including the user's gesture through the stereo camera 22 provided in the main body 2 or the head camera 32 provided in the head 3.

The voice may include a command to be processed by the robot 1. According to an embodiment, the voice may include a word or a phrase (hereinafter, referred to as a 'keyword') indirectly indicating a pointed target (or a point). For example, the voice may include a pronoun (this, that, here, there, and so on) indicative of the pointed target instead of a proper noun which directly indicates the pointed target.

The gesture may include a user's hand motion, foot motion, a gaze, and face rotation indicative of a predetermined position (pointed position).

Meanwhile, the microphone 122 is always activated during the operation of the robot 1 to acquire a user's voice. In this case, when the controller 180 acquires a voice including a start word through the microphone 122, the controller 180 may activate the stereo camera 22 or the head camera 32 to acquire an image including a user's gesture.

According to an embodiment, the robot 1 may activate the stereo camera 22 and the head camera 32 while traveling. In this case, the controller 180 may acquire an image including the user's gesture through the stereo camera 22 or the head camera 32 even without a start word.

The robot 1 may recognize a pointed position and a command on the basis of the acquired voice and gesture (S110).

The controller 180 (or the image recognition processor) may analyze the image including the user's gesture to recognize a pointed position (or a pointed direction) corresponding to the gesture. According to an embodiment, the controller 180 (or the voice recognition processor) may recognize the pointed position on the basis of a keyword included in the acquired voice.

Also, the controller 180 (or the voice recognition processor) may recognize a command included in the acquired voice.

The robot 1 may acquire an image including the recognized pointed position (S120).

Based on the recognized pointed position, the controller 180 may rotate the head 3 such that the head camera 32 faces the pointed position. For rotation of the head 3, the controller 180 may control the second head motor 153.

According to an embodiment, the controller 180 may control the first head motor 151 and/or the body tilting motor 155 such that the head camera 32 faces the pointed position.

The second head motor 153 may move the direction of the head camera 32 to the left and right, and the first head motor 151 and/or the body tilting motor 155 may move the direction of the head camera 32 up and down. The first head motor 151 and/Direction may be moved up and down. That is, the controller 180 may control the head camera 32 to accurately face the pointed position by controlling the second head motor 153, the first head motor 151 and/or the body tilting motor 155.

The controller 180 may control the head camera 32 to acquire an image including the pointed position.

However, according to an embodiment, the controller 180 may acquire an image including the pointed position using the stereo camera 22. In this case, the controller 180 may control the body tilting motor 155 and/or the driving motor 160 such that the stereo camera 22 faces the pointed position.

The robot 1 may identify a pointed target on the basis of at least one of the acquired image or voice (S130).

The controller 180 may identify the pointed target (or point) indicated by the user by using at least one of the image including the pointed position or the acquired voice.

For example, the controller 180 (or the image recognition processor) may identify an object corresponding to the pointed position or closest to the pointed position among at least one object included in the image, as a pointed target.

Alternatively, the controller 180 may identify a pointed point corresponding to the pointed position from the image including the pointed position. In this case, the controller 180 may acquire position information of the pointed point, and the position information may include coordinate information set by the robot 1 or the like.

Meanwhile, the controller 180 may identify the pointed target (or point) from the image including the pointed position, based on the keyword included in the acquired voice. For example, when the keyword includes a pronoun (this, that, etc.) indicating 'target', the controller 180 may identify the pointed target from the image including the pointed position. Alternatively, when the keyword includes a pronoun (here, there, and the like) indicating 'point', the controller 180 may identify the pointed point from the image including the pointed position.

Meanwhile, if the command corresponds to "turn off", the controller 180 may identify a pointed target (or point) from the image based on the command included in the acquired voice. For example, when the command corresponds to "turn off", the controller 180 may identify "lighting" among "lighting" and "toy" corresponding to the pointed position as the pointed target. Alternatively, when the command corresponds "clean" or "remove", the controller 180 may identify, as the pointed target, "foreign body", among "air cleaner" and "foreign body", corresponding to the pointed position.

The robot 1 may perform a control operation based on the identified pointed target and the recognized command (S140).

The controller 180 may process the command by performing a control operation based on the identified pointed target and the recognized command.

Meanwhile, when the recognized command can be processed by the robot 1, the controller 180 may control the operation of the components included in the robot 1 to directly process the command. An example related to this will be described later with reference to FIGS. 4 to 6.

Meanwhile, when the recognized command cannot be processed by the robot 1 and can be processed by another device communicatively connected to the robot 1, the controller 180 may transmit a control signal corresponding to the command to the connected other device. This will be described later with reference to FIGS. 7 to 10.

Figure 4:
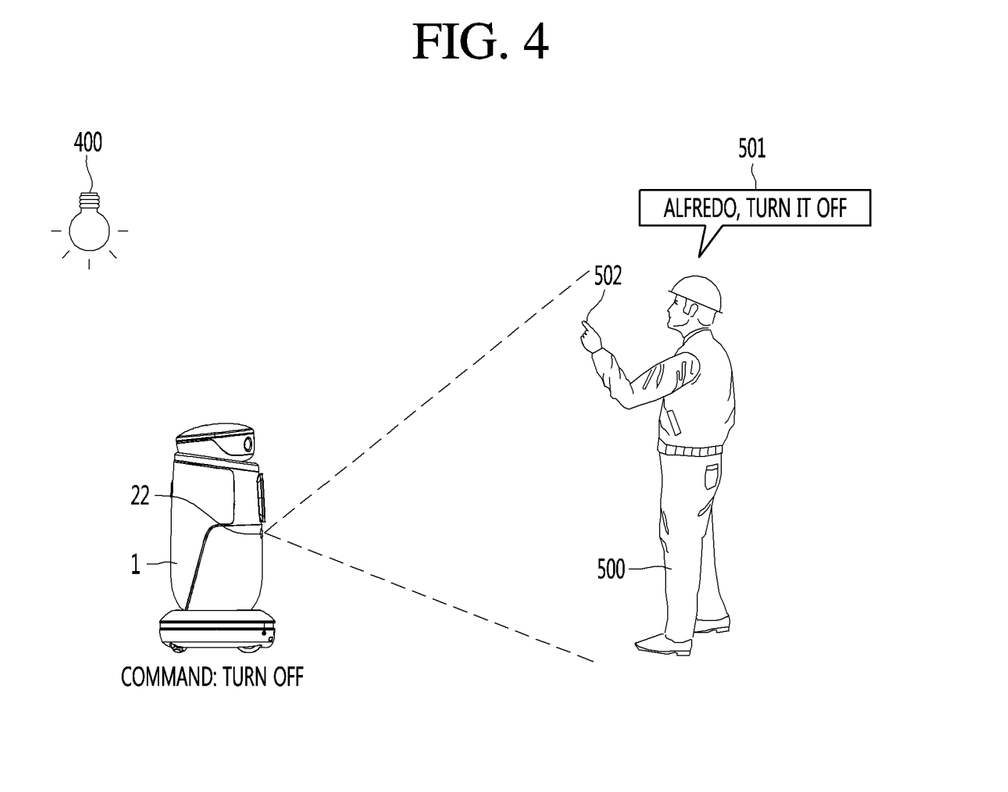
FIGS. 4 to 6 are exemplary diagrams related to an operation method of a robot shown in FIG. 3.
Figure 5:
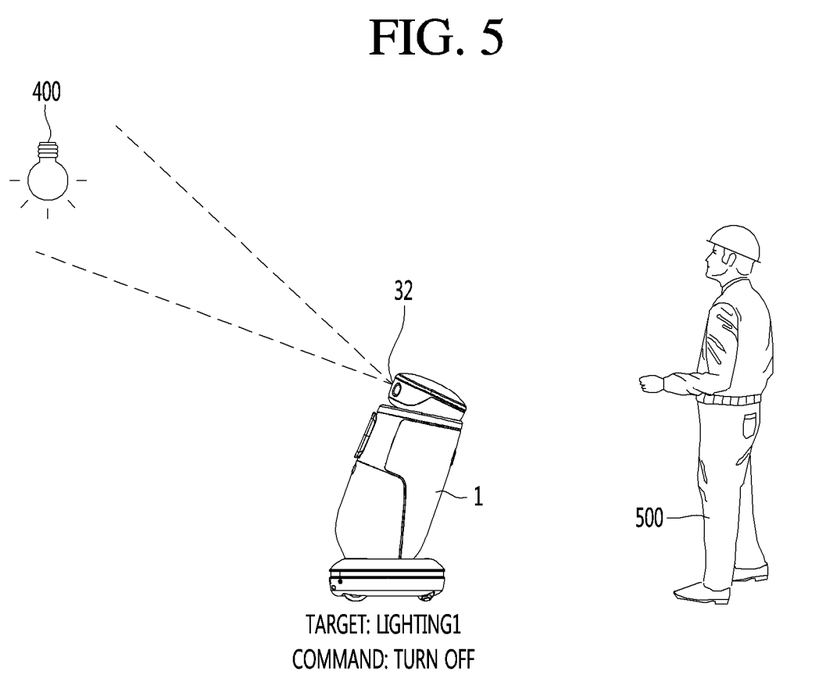
Figure 6:
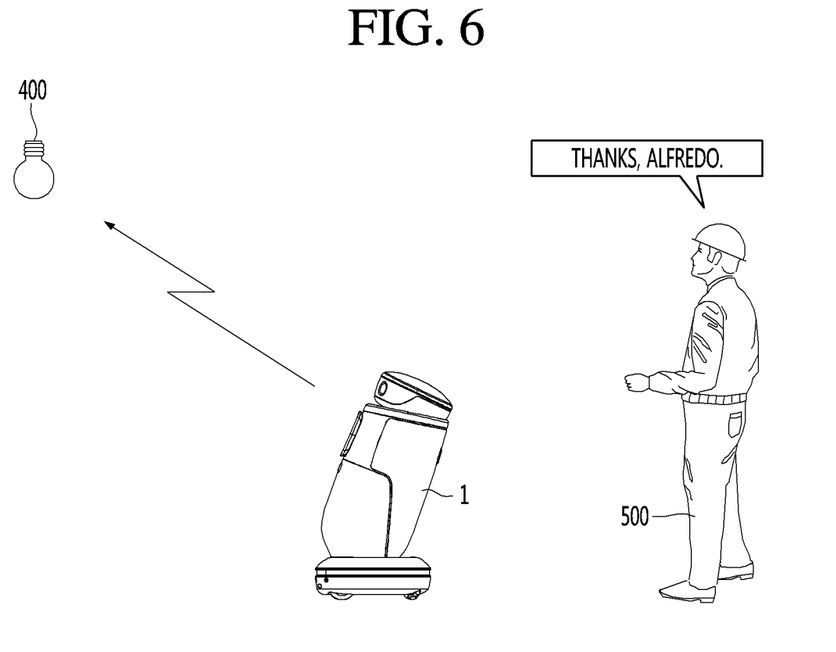

FIGS. 4 to 6 are exemplary diagrams related to an operation method of the robot shown in FIG. 3.

Referring to FIG. 4, when the user wants to turn off a lighting 400, the user 500 may utter a voice 501 that includes a command for controlling to turn off the lighting 400 and make a gesture 502 indicating the lighting 400.

The robot 1 may acquire the voice 501 of the user 500 through the microphone 122 and acquire an image including the gesture 502 of the user 500 using the stereo camera 22.

The controller 180 (or the voice recognition processor) may recognize the command "turn off" from the keyword ("turn off") included in the acquired voice 501.

Also, the controller 180 (or the image recognition processor) may recognize that the pointed position corresponds to the rear upper side of the robot 1, based on the gesture 502 included in the acquired image.

Referring to FIG. 5, the controller 180 may control at least one of the first head motor 151, the second head motor 153, the body tilting motor 155, or the driving motor 160 such that the head camera 32 provided on the head 3 faces the recognized pointed position.

The controller 180 may control the head camera 32 to acquire an image including the pointed position when the head camera 32 faces the pointed position as the at least one motor is controlled.

The controller 180 may recognize at least one object included in the image acquired through the head camera 32. For example, when the image includes the lighting 400, the controller 180 may identify that the pointed target is lighting.

According to an embodiment, the controller 180 may identify the lighting 400 included in the image on the basis of position information of the robot 1, among a plurality of lightings present in a space (for example, the home) in which the robot 1 is disposed. For example, based on the position information of the robot 1, the controller 180 may identify that the lighting 400 corresponds to "lighting 1" among a plurality of lighting in the home.

According to an embodiment, when a plurality of objects are recognized from the acquired image, the controller 180 may identify an object closest to the pointed position as the pointed target. Alternatively, the controller 180 may identify an object related to the recognized command as the pointed target.

That is, the controller 180 may identify the pointed target as "lighting" on the basis of the user's voice and gesture without acquiring a keyword (proper noun, etc.) directly indicating "lighting" from the user's voice.

As a result, the controller 180 may recognize that the user's voice and gesture include a command to "turn off lighting 1", on the basis of the identified pointed target and the recognized command.

Referring to FIG. 6, the controller 180 may transmit a control signal for turning off the lighting 400 to the lighting 400 or a lighting controller (not shown) through the communication unit 110 based on the recognition result. The lighting 400 or the lighting control device (not shown) may turn off the lighting 400 in response to the received control signal.

That is, according to an embodiment shown in FIGS. 3 to 6, the robot 1 may accurately recognize the control command and the control target (pointed target) on the basis of the voice and the gesture of the user. In particular, the robot 1 may smoothly recognize the control target even without acquiring a direct keyword such as a proper noun indicative of the control target from the user. Accordingly, the user may conveniently input a desired command through a natural type utterance and a gesture without uttering a voice according to a method previously defined with the robot 1.

Figure 7:
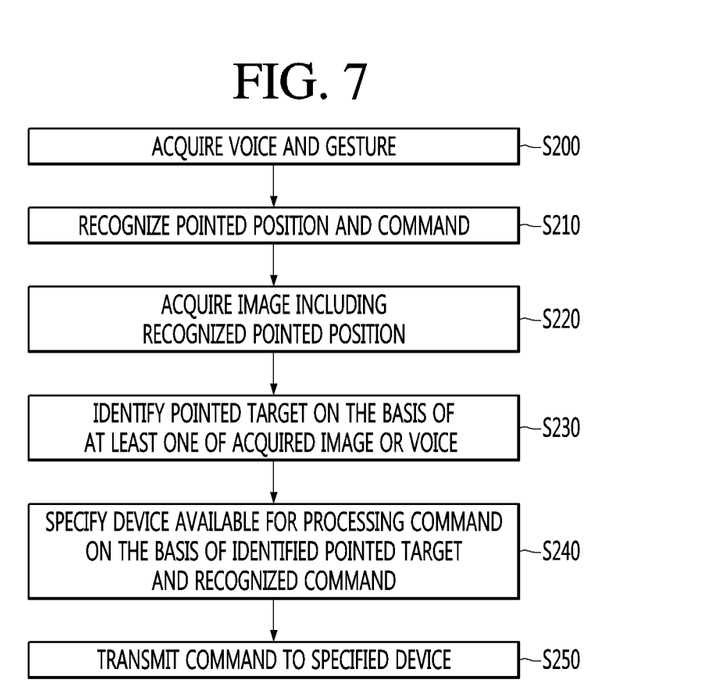
FIG. 7 is a flowchart illustrating an operation method of a robot according to an embodiment of the present invention.

FIG. 7 is a flowchart illustrating an operation method of a robot according to an embodiment of the present invention.

Referring to FIG. 7, the robot 1 may acquire a voice and gesture of the user (S200) and recognize a pointed position and a command on the basis of the acquired voice and gesture (S210). The robot 1 may acquire an image including the recognized pointed position (S220) and identify a pointed target (or point) on the basis of at least one of the acquired image or voice (S230).

Steps S200 to S230 are substantially the same as steps S100 to S130 of FIG. 3, and thus, a detailed description thereof will be omitted.

The robot 1 may specify a device capable of processing the command on the basis of the identified pointed target and the recognized command (S240).

The controller 180 may specify a device capable of processing the command among the plurality of devices on the basis of the device information of each of the plurality of devices stored in the memory 170.

For example, the device information may include a list of processable commands. The controller 180 may specify a device corresponding to the device information including the recognized command as a device capable of processing the command.

The robot 1 may transmit the command to the specified device (S250).

Specifically, the controller 180 may transmit a control signal including information on the pointed target and information on the command to the specified device through the communication unit 110.

Although not shown, the robot 1 may receive information indicative of completion of an operation corresponding to the command from the specified device, and notify the user that the command has been processed on the basis of the received information.

Figure 8:
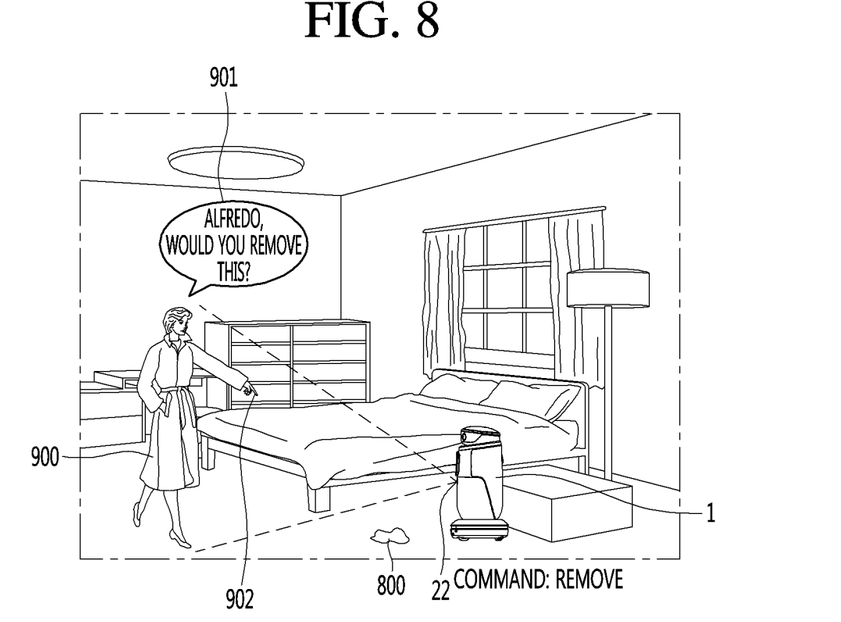
FIGS. 8 to 10 are exemplary diagrams related to an operation method of a robot shown in FIG. 7.
Figure 9:
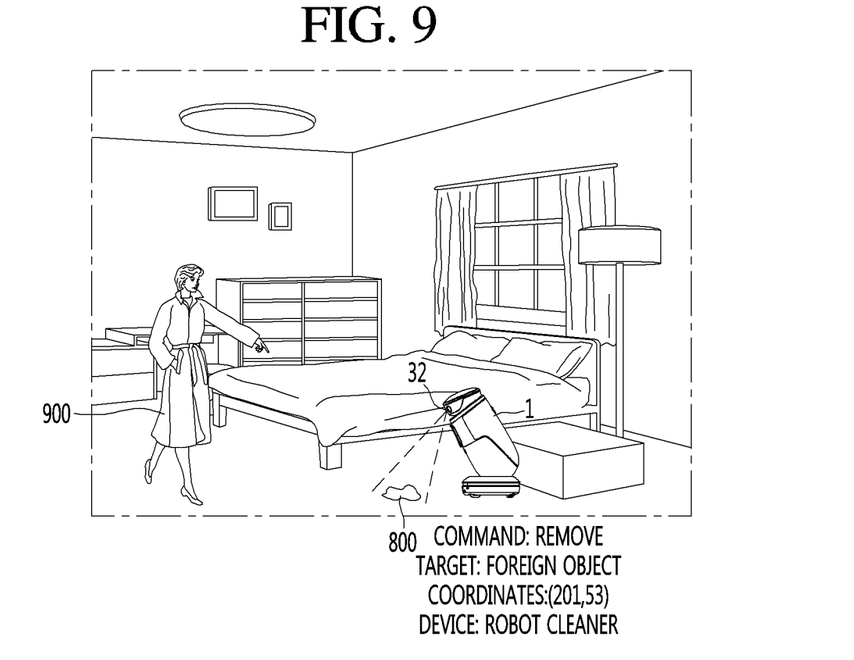
Figure 10:
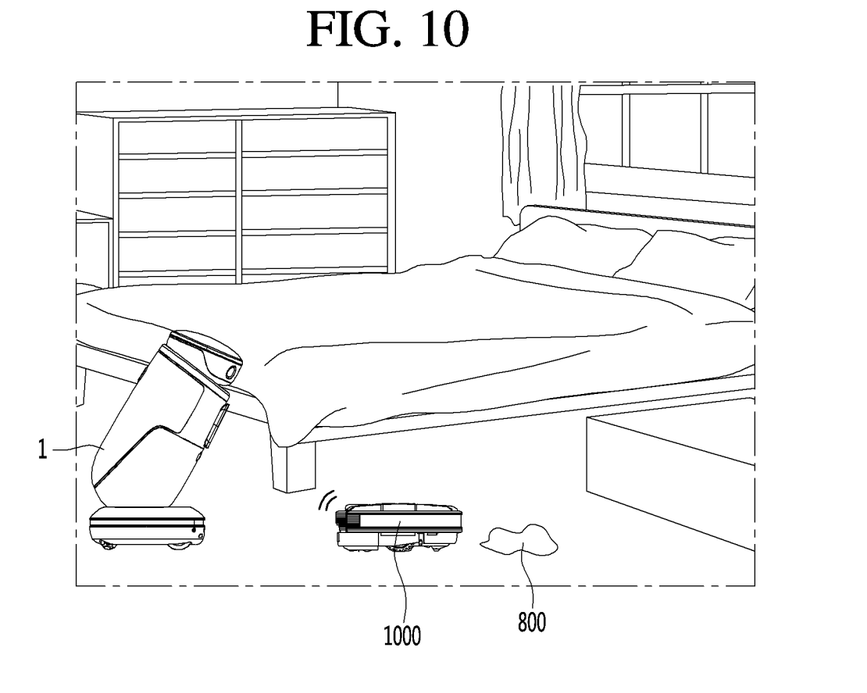

FIGS. 8 to 10 are exemplary diagrams related to an operation method of the robot shown in FIG. 7.

Referring to FIG. 8, when the user 900 wants to remove (or clear) a foreign object 800 existing at a specific point, the user 900 may utter a voice 901 including a command of controlling to remove the foreign object 800 of the specific point and make a gesture 902 indicating the specific point or foreign object 800.

The robot 1 may acquire the voice 901 of the user 900 through the microphone 122 and acquire an image including the gesture 902 of the user 900 using the stereo camera 22.

The controller 180 (or the voice recognition processor) may recognize the command "clear" from a keyword ("clear") included in the acquired voice 901.

Also, the controller 180 (or the image recognition processor) may recognize that the pointed position corresponds to the front lower side of the robot 1, on the basis of the gesture 902 included in the acquired image.

Referring to FIG. 9, the controller 180 may control at least one of the first head motor 501, the second head motor 153, and the body tilting motor 155, or the driving motor 160 such that the head camera 32 provided in the head 3 faces the recognized pointed position. For example, in the embodiment of FIG. 9, the controller 180 may control the first head motor 501 and/or the body tilting motor 155 to direct the head camera 32 to face the recognized pointed position.

When the head camera 32 faces the pointed position according to the control result, the controller 180 may control the head camera 32 to acquire an image including the pointed position.

The controller 180 may recognize at least one object included in the image acquired through the head camera 32. For example, when the image includes the foreign object 800, the controller 180 may identify that the pointed target is the foreign object 800.

According to an embodiment, the controller 180 may identify the pointed point corresponding to the pointed position on the basis of a keyword ("here") included in a voice of the user. In this case, the controller 180 may acquire coordinates (e.g., 201, 53) corresponding to the pointed point on the basis of coordinate information set for the space in which the robot 1 is disposed.

On the basis of the identified pointed target (or point) and the recognized command, the controller 180 may recognize that the user's voice and gesture include a command corresponding to "clear foreign object".

The controller 180 may specify the robot cleaner as a device available for processing the recognized command among a plurality of devices.

Referring to FIG. 10, the controller 180 may transmit a control signal for clearing the foreign object 800 to the robot cleaner 1000 through the communication unit 110 on the basis of the recognition result. Meanwhile, the control signal may include coordinates of a point where the foreign object 800 exists.

The robot cleaner 1000 may move to a position corresponding to the coordinates in response to the received control signal and perform an operation to remove the foreign object 800.

The controller 180 may receive a message indicating that the removing of the foreign object 800 is completed from the robot cleaner 1000 and output a notification indicating that the command has been processed on the basis of the received message through the display 24 or the speaker 140.

Alternatively, the controller 180 may check whether the foreign object 800 was removed from an image acquired through the stereo camera 22 or the head camera 32, and output a notification indicating that the foreign object 800 has been removed through the display 24 or the speaker 140.

In other words, according to the embodiment shown in FIGS. 7 to 10, the robot 1 may control other devices available for processing the control command on the basis of the control command and the control target recognized through the user's voice and gesture. Accordingly, the user may conveniently control operations of other devices not provided with means such as a microphone or a camera through the robot 1 by voice and gesture.

Figure 11:
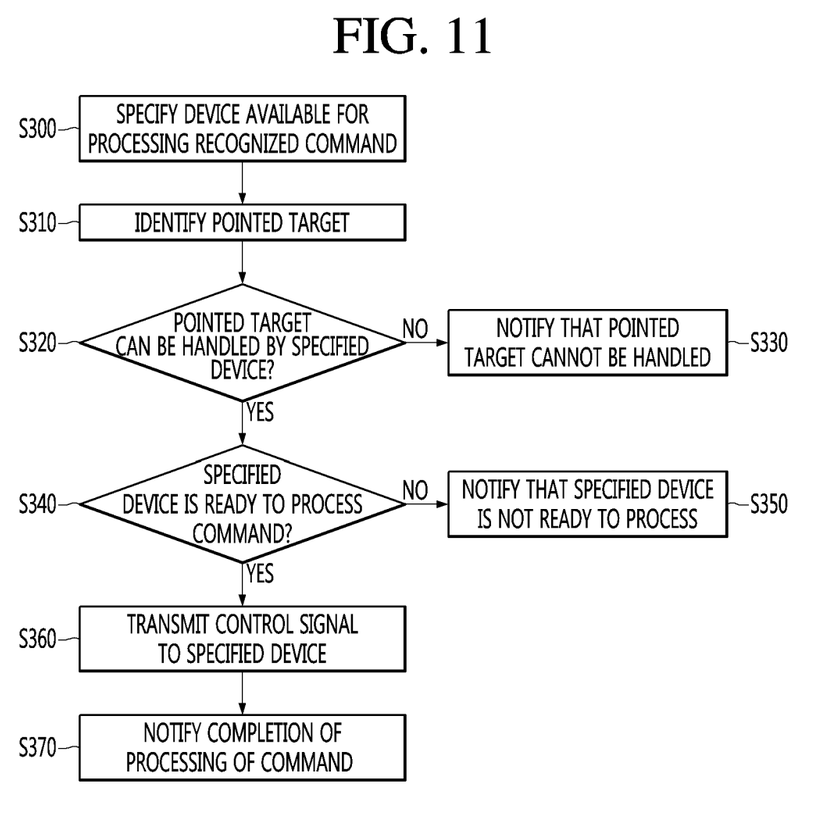
FIG. 11 is a flowchart showing a more specific example related to an operation method of a robot shown in FIG. 7.

FIG. 11 is a flowchart showing a more specific example related to the operation method of the robot shown in FIG. 7.

Referring to FIG. 11, the robot 1 may specify a device available for processing a command recognized from a user's voice (S300). Further, the robot 1 may identify a pointed target on the basis of the user's gesture and/or voice (S310).

Steps S300 and S310 are similar to those described above with reference to FIGS. 3 and 7, and thus, a description thereof will be omitted.

The robot 1 may check whether the identified pointed target is an object that may be processed by the specified device (S320).

For example, the controller 180 may check whether the specified device is available for processing the command for the pointed target, on the basis of device information of the specified device and the identified pointed target.

For example, the controller 180 may check whether the specified device is available for processing a command for the pointed target on the basis of a specification of the device included in the device information. Alternatively, the controller 180 may check whether the specified device is available for processing the command by checking whether the pointed target is included in a processable object list included in the device information.

If it is determined that the specified device is not available for processing the command for the pointed target (NO in S320), the robot 1 may display through the display 24, the speaker 140, or the like, that the pointed target cannot be handled (S330).

Meanwhile, when it is determined that the specified device is available for processing the command for the pointed target (YES in S320), the robot 1 may check whether the specified device is currently ready for processing the command (S340).

For example, the controller 180 may transmit a request for providing state information to a specified device. The device may transmit state information of the device to the robot 1 in response to the received request. The controller 180 may check whether the specified device is currently ready for processing the command on the basis of the received state information.

According to an embodiment, the robot 1 may periodically receive state information from each of a plurality of devices. In this case, the controller 180 may check whether the specified device is currently ready for processing the command without transmitting a separate request.

The state information may include an operation state, battery information, and the like, of the device. For example, when the device is currently on standby, the controller 180 may determine that the device is ready to process the command. Meanwhile, if the device is currently performing an operation or if a remaining battery amount of the device is lower than a reference amount, the controller 180 may determine that the device is not ready to process the command.

In FIG. 11, it is illustrated that step S340 is performed after step S320 is performed. However, steps S320 and S340 may be performed in parallel, or step S320 may be performed after step S340 according to an embodiment.

If it is determined that the specified device is not ready to process the command (NO in S340), the robot 1 may notify the user through the display 24 and/or the speaker (not shown) that the specified device is not ready to process the command 140 (S350).

Meanwhile, if it is determined that the specified device is ready to process the command (YES in S340), the robot 1 may transmit a control signal corresponding to the identified pointed target and the recognized command to the specified device (S360).

The robot 1 may sense that the command is processed by the specified device, and output a notification indicating completion of processing of the command on the basis of a detection result (S370).

For example, the specified device may process the command by performing an operation according to the control signal. When the processing of the command is completed, the device may transmit a message indicating completion of processing of the command to the robot 1. The controller 180 may output a notification indicative of completion of processing of the command through the display 24 and/or the speaker 140 on the basis of the received message.

According to an embodiment, the controller 180 may detect completion of processing of the command from an image or sound acquired through at least one of the stereo camera 22, the head camera 32, or the microphone 122.

According to an embodiment of the present invention, the robot may accurately recognize the control command and the control target (pointed target) on the basis of the user's voice and gesture.

In particular, the robot may smoothly recognize the control target even without acquiring a direct keyword such as a proper noun indicative of the control target from the user. Accordingly, the user may conveniently input a desired command through a natural type utterance and gesture without uttering a voice in accordance with a method previously defined with the robot.

In addition, the robot according to an embodiment of the present invention can control other devices available for processing the control command on the basis of the recognized control command and the control target. Accordingly, the user may conveniently control the operation of the other device not equipped with the microphone or the camera by a voice and gesture through the robot.

The above description is only an example describing a technological scope of the present invention. Various changes, modifications, and replacements may be made by those skilled in the art without departing from the spirit and scope of the present invention.

Therefore, the embodiments disclosed above and in the accompanying drawings should be considered in a descriptive sense only and not for limiting the technological scope. The technological scope of the present invention is not limited by the embodiments and the accompanying drawings.

The spirit and scope of the present invention should be interpreted by the appended claims and encompass all equivalents falling within the scope of the appended claims.

What is claimed is:

1. A robot comprising:
a microphone configured to acquire a voice;
a camera configured to acquire a first image including a gesture; and
a controller configured to:
recognize the acquired voice, recognize a pointed position corresponding to the gesture included in the first image,
control the camera to acquire a second image including the recognized pointed position,
identify a pointed target included in the second image, and
perform a control operation on the basis of the identified pointed target and a command included in the recognized voice,
wherein the controller is configured to recognize the command and a keyword indicative of the pointed target included in the acquired voice,
wherein the keyword indirectly indicates the pointed target,
wherein the camera includes:
a first camera disposed in a main body; and
a second camera disposed in a head rotatably provided at an upper portion of the main body,
wherein the first image is acquired through the first camera, and the second image is acquired through the second camera,
wherein the robot further comprises a head motor configured to rotate the head with respect to the main body, and
wherein the controller is configured to control the head motor to cause the second camera to be oriented to the recognized pointed position.

2. The robot of claim 1, wherein the keyword indicative of the pointed target comprises a pronoun related to the pointed target.

3. The robot of claim 1, wherein the controller is configured to recognize at least one object included in the acquired second image and identify the pointed target on the basis of the at least one recognized object and the keyword.

4. The robot of claim 1, wherein the controller is configured to recognize at least one object included in the acquired second image and identify an object closest to the pointed position, among the at least one object, as the pointed target.

5. The robot of claim 1, wherein the gesture comprises at least one of a user's hand motion, foot motion, gaze, or face rotation indicative of the pointed position.

6. The robot of claim 1, wherein, when the performing of a control operation on the basis of the identified pointed target and the recognized command is completed, the controller is configured to output a notification indicative of completion of processing of the command through at least one of a display or a speaker.

7. The robot of claim 1, further comprising:
a communication unit to be connected to at least one device,
wherein the controller is configured to specify a device available for processing the command on the basis of the identified pointed target and the recognized command, and control the communication unit to transmit a control signal corresponding to the command to the specified device.

8. The robot of claim 7, wherein the controller is configured to receive a message indicative of completion of processing of the command from the specified device, and outputs a notification indicative of completion of processing of the command through at least one of a display or a speaker in response to the received message.

9. The robot of claim 7, wherein the controller is configured to detect whether the command has been completely processed on the basis of an image acquired through the camera, and outputs a notification indicative of completion of processing of the command through at least one of a display or a speaker on the basis of a detection result.

10. The robot of claim 1, wherein the pointed target comprises a pointed point, and
the controller is configured to acquire coordinates corresponding to the pointed point.

11. A method of operating a robot, the method comprising:
acquiring a voice;
acquiring a first image including a gesture;
recognizing the acquired voice;
recognizing a pointed position corresponding to the gesture included in the first image;
controlling a camera to acquire a second image including the recognized pointed position;
identifying a pointed target included in the second image; and
performing a control operation on the basis of the identified pointed target and a command included in the recognized voice,
wherein recognizing the acquired voice includes recognizing the command, and a keyword indicative of the pointed target included in the acquired voice,
wherein the keyword indirectly indicates the pointed target,
wherein the camera includes:
a first camera disposed in a main body; and
a second camera disposed in a head rotatably provided at an upper portion of the main body,
wherein the first image is acquired through the first camera, and the second image is acquired through the second camera,
wherein the robot further comprises a head motor configured to rotate the head with respect to the main body, and
wherein controlling the camera to acquire the second image includes controlling the head motor to cause the second camera to be oriented to the recognized pointed position.

12. The method of claim 11, wherein the identifying the pointed target included in the second image comprises:
recognizing at least one object included in the acquired second image; and
identifying the pointed target on the basis of the at least one recognized object and the keyword.

13. The method of claim 11, wherein the identifying the pointed target included in the second image comprises:
recognizing at least one object included in the acquired second image; and
identifying an object closest to the pointed position, among the at least one object, as the pointed target.

14. The method of claim 11, further comprising:
when the performing of a control operation on the basis of the identified pointed target and the recognized command is completed, outputting a notification indicative of completion of processing of the command through at least one of a display or a speaker.

15. The method of claim 11, wherein the performing the control operation comprises:
specifying a device available for processing the command on the basis of the identified pointed target and the recognized command; and
transmitting a control signal corresponding to the command to the specified device.

16. The method of claim 15, further comprising:
receiving a message indicative of completion of processing of the command from the specified device; and outputting a notification indicative of completion of processing of the command through at least one of a display or a speaker in response to the received message.

* * * * *